United States Patent [19]

Polster

[11] Patent Number: 4,702,159
[45] Date of Patent: Oct. 27, 1987

[54] FOOD PRESS

[76] Inventor: Louis S. Polster, 1017 Fairmount Rd., Burbank, Calif. 91501

[21] Appl. No.: 2,010

[22] Filed: Jan. 12, 1987

Related U.S. Application Data

[63] Continuation-in-part of Ser. No. 678,699, Dec. 6, 1984, Pat. No. 4,635,538.

[51] Int. Cl.$^4$ .............................................. A47J 37/06
[52] U.S. Cl. .......................................... 99/349; 99/342; 99/422; 99/426; 99/447; 220/458; 426/523
[58] Field of Search ................. 99/342, 349, 372, 422, 99/426, 447; 126/390; 220/458; 204/38.3, 37.1; 426/523; 100/93 P

[56] References Cited

U.S. PATENT DOCUMENTS

| | | | |
|---|---|---|---|
| 1,624,214 | 4/1927 | Cannon | 99/349 |
| 2,040,676 | 5/1936 | Stevens | 99/349 X |
| 2,094,406 | 9/1937 | Mincks | 99/349 |
| 2,522,175 | 9/1950 | Hill | 99/349 |
| 2,618,258 | 11/1952 | Kroyer | 99/422 X |
| 3,322,113 | 5/1967 | Simjian | 99/422 X |
| 3,623,422 | 11/1971 | Marshall | 99/349 X |
| 4,083,205 | 4/1978 | Clarke et al. | 100/93 P |
| 4,170,933 | 10/1979 | Meamber | 99/349 |
| 4,217,817 | 8/1980 | Meamber | 99/349 |
| 4,408,520 | 10/1983 | Wons et al. | 100/93 P |

Primary Examiner—Timothy F. Simone
Attorney, Agent, or Firm—Allan M. Shapiro

[57] ABSTRACT

Food press has a cooking plate which rests upon a grill for heating and rests upon a food material for the cooking thereof when the food material is on a grill. A skirt surrounds the top and sides of the cooking plate, and the cooking plate floats with respect to the skirt. A manual handle is provided to lift the skirt and lift the cooking plate. A pin in the cooking plate engages in a slot in the skirt so that the cooking plate can be held in a raised position within the skirt to hold it above the grill for some cooking circumstances.

11 Claims, 5 Drawing Figures

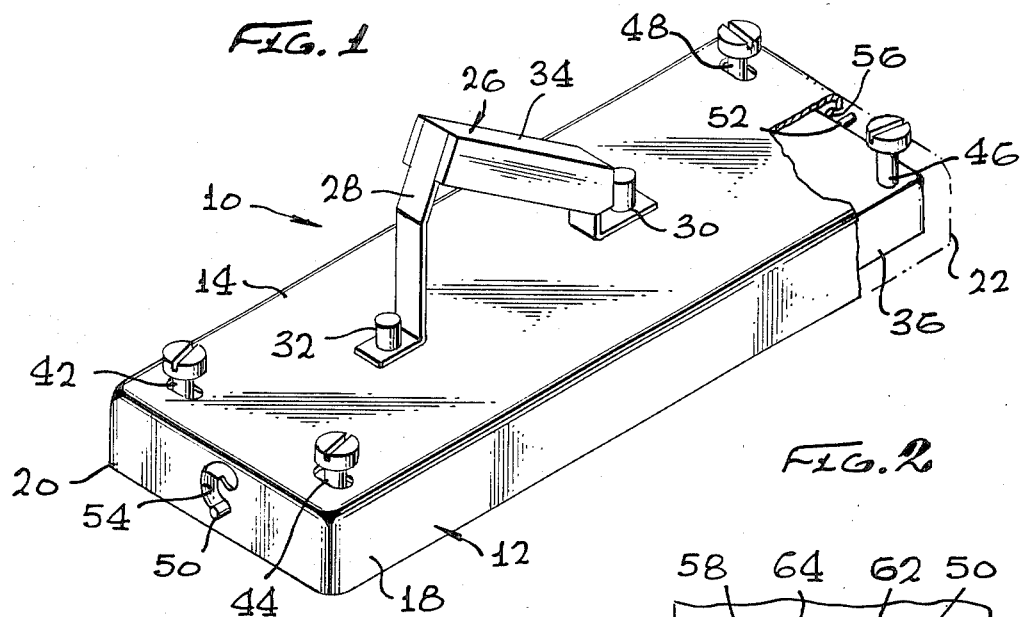
Fig. 1
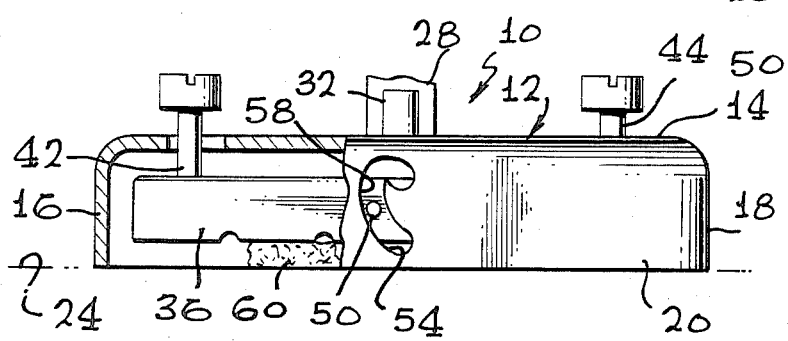
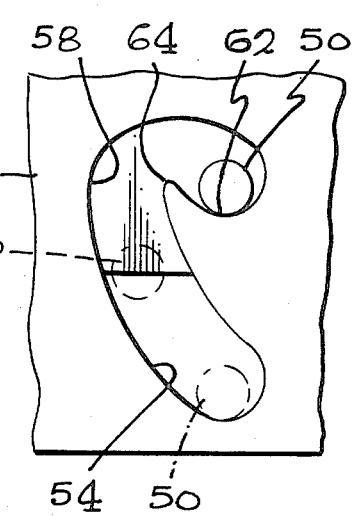
Fig. 3
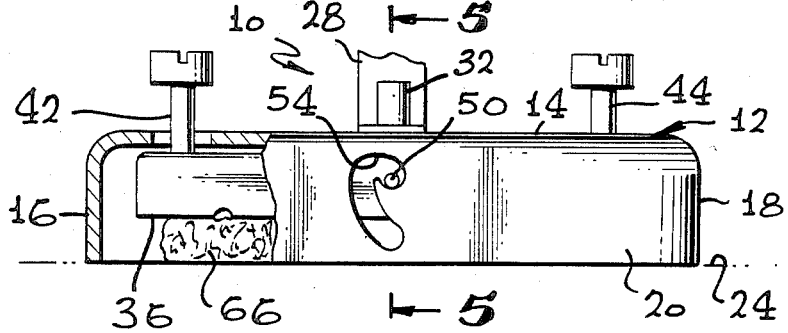
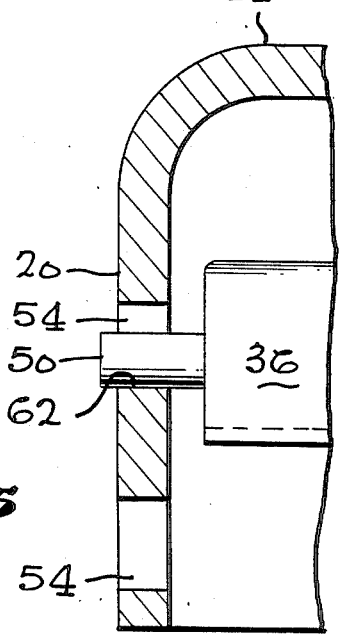
Fig. 4
Fig. 5

FOOD PRESS

CROSS-REFERENCE

This application is a continuation-in-part of my earlier application Ser. No. 678,699, filed Dec. 6, 1984, to be granted on Jan. 13, 1987 as U.S. Pat. No. 4,635,538, the entire disclosure of which is incorporated herein by this reference.

BACKGROUND OF THE INVENTION

This invention is directed to a food press for preheating and placement on top of food items such as, for example, hamburger, bacon, sausages, steaks or chicken breasts, located on a cooking grill, so as to hold the food item down and to cook the top of the food item while the cooking grill is cooking the food item from the bottom. The cooking plate in the food press is provided with retention means to hold some of its weight so that it presses only lightly on the food item being cooked, when such is desired, when grilling such items as steak.

Most of the presses which are presently on the market are designed to put weight on the meat, hamburger or bacon in order to hold it down on the grill. Such presses have little thermal capacity and do not supply sufficient heat to accomplish cooking from the top. Furthermore, such presses do not have the capacity to hold the cooking plate in a raised position to limit the cooking plate pressure on the food item.

SUMMARY OF THE INVENTION

In order to aid in the understanding of this invention, it can be stated in essentially summary form that it is directed generally to a food press having a cooking plate therein of sufficient mass so that, when the cooking plate is heated substantially to the temperature of a grill at cooking temperature, the cooking plate supplies sufficient heat to cook the top of the food item without turning it over. Interengagement between the skirt and cooking plate of the food press permits holding the cooking plate raised within the skirt to limit cooking plate pressure while supplying heat.

It is, thus an object of this invention to provide a food press having a cooking plate therein for the cooking of the top of a frozen hamburger patty, which cooking plate is surfaced to minimize sticking of hamburger thereto and is flat so that it can be scraped clean with a spatula or the like so that it can be used for cooking through an entire meal period without need for specialized cleaning.

It is another object of this invention to provide a food press wherein the cooking plate can be restrained upward in the skirt so that the cooking plate does not bear with its full weight on food material cooked on a grill under the food press.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the preferred embodiment of the food press of this invention, with parts broken away.

FIG. 2 is an enlarged end elevational view of the skirt, with parts broken away, showing the slot in the end of the skirt by which the cooking plate is held in the raised position.

FIG. 3 is an end elevational view of the press of FIG. 1, on enlarged scale, and with parts broken away, showing the relationship of the parts when the food press is used for cooking a hamburger.

FIG. 4 is a view similar to FIG. 3, showing the relationship of the parts when the food press is used for cooking a thicker food item, such as a steak.

FIG. 5 is an enlarged section taken generally along the line 5—5 of FIG. 4, with parts broken away.

DESCRIPTION OF THE PREFERRED EMBODIMENT

FIGS. 1, 3 and 4 show the preferred embodiment of the food press at 10. Skirt 12 is an open-bottom, generally rectangular structure with rounded corners. It has top 14 of generally rectangular configuration, downwardly-extending skirt sides 16 and 18 and ends 20 and 22. The sides and ends are preferably formed as a unitary structure with top 14 and may be drawn from rolled aluminum flat stock into an open-bottomed skirt structure, as illustrated. The sides and ends terminate in a plane so that the skirt will rest on the flat top 24 of a cooking griddle. The griddle is heated from the bottom and has a temperature control so that the griddle top is maintained at a substantially uniform temperature, for example 375° F. for cooking hamburgers.

Handle 26 is formed with a metallic strap 28 secured to the top of skirt 12. Upward extending studs 30 and 32 are secured to the top of the skirt, and holes in the ends of strap 28 engage over the studs. Hand grip 34 is made of thermal insulative material so the the exterior surface thereof remains sufficiently cool that it can be handled.

Cooking plate 36 is of rectangular configuration and sized to fit within skirt 12. Cooking plate 36 is a thermal mass. In the preferred embodiment, the cooking plate is solid aluminum of about ½ inch thick. Four studs 42, 44, 46 and 48 pass through openings in the corners of the top 14 of skirt 12 and are threaded into the corners of the cooking plate 36. Each stud has a head mounted on a shank of smaller diameter. The shank passes through the clearance hole in the top of the skirt, and the head engages on the top of the skirt so that the plate can move a limited distance (the length of the shank) up and down within the skirt. The shanks of the studs are sufficiently long that when engaged against the top skirt, the bottom surface of the cooking plate extends out of the skirt. Thus, when the food press 10 is placed upon a griddle, the bottom surface of the cooking plate rests directly against the griddle top 24. The lower edges of the sides and ends of the skirt rest against the griddle top around the cooking plate. In this condition, the cooking plate is heated by the griddle. For cooking frozen hamburgers, the griddle is controlled so that its temperature is preferably about 375° F.

For the cooking of some types of food articles, it is desirable to prevent the full weight of cooking plate from resting on the food article. For example, it is desirable to prevent the weight of the cooking plate from resting on steaks, chicken white meat fillets, or fish fillets. In order to selectively support the cooking plate in a raised position, the cooking plate is provided with support pins 50 and 52 which extend axially out of the ends of the cooking plate. Both support pins are shown in FIG. 1, while the support pin 50 at the left end of FIG. 1 is shown in more detail in FIGS. 2, 3, 4 and 5. The support pins respectively extend through inverted J-slots 54 and 56 which are formed respectively in the ends 20 and 22 of the skirt. When the pins are in the long upright leg of the J-slot, for example leg 58 of J-slot 54 as seen in FIG. 3, the cooking plate can freely move downwardly within the skirt, even to the point where the bottom surface of the cooking plate is resting on the top surface of grill 24. In FIG. 3, hamburger 60 is shown as resting upon the grill surface and having the full weight of the cooking plate resting on the hamburger. In this way, the food press 10 is suitable for use in cooking hamburgers. When it is desired that food materials be cooked without the direct contact of the cooking plate, the cooking plate can be raised and retained in the raised position. This is accomplished by the detent notch 62, see FIG. 2, at the top and at the side of upright leg 58. The detent notch is sized to receive and retain the support pin and projection 64 between the detent notch and the upright leg 58 retain the support pin 50 detented in raised position until its release is desired and manually accomplished. In the raised position shown in FIG. 4, the cooking plate is held in contact with the top of the steak 66 being cooked on grill 24 with some of its weight held by the skirt. The cooking plate provides heat to cook the steak, but without the full physical load of the cooking plate, the steak is not pressed out so there is no reduction in steak thickness due to excess pressure during cooking. This cooking mode is also useful in the grilling of fish fillets and chicken white meat fillets. The detented position is also shown in FIG. 5.

In use, the press 10, possibly with several similar presses, is placed on the hot griddle and is heated thereby. When the hamburgers are placed on the grill, press 10 is picked up and placed on top of them with the cooking plate in the released position. The hamburger patties are frozen when they are placed on the grill, but there is sufficient heat in the cooking plate 36 to thaw and cook the top half. Since the cooking plate 36 is floating with respect to skirt 12, the cooking plate rests upon the hamburger patties and the skirt rests down on the top surface of the griddle around the hamburgers. The thermal mass of cooking plate 36 has enough thermal energy that it will supply sufficient heat to thaw the upper portion of the hamburger and cook the top surface of the hamburger so that it seals in the juices. It also has enough thermal energy to continue to impart heat to the top surface to cook the top surface. If the cooking plate 36 is at least 350° F. at the beginning of the cooking, as is preferred, the hamburgers do not need to be turned because sufficient heat is supplied by the cooking plate 36 to cook the top half of the hamburger.

The surface finish of the cooking plate 36 in contact with the food item is important to minimize sticking of the food item. The cooking plate is polished, hard anodized, coated with vegetable shortening, and heated for an adequate length of time and at an adequate temperature to achieve the golden brown colored non-stick surface. 575° F. is the preferred temperature with a time from 20 to 30 minutes. The temperature range starts at the bottom at about 350° F., with a very long time in the furnace, and with increasing temperature the time decreases roughly at a rate such that for every 10 degrees Centigrade increase in temperature, the reaction rate is doubled so the result is achieved in half the time. The upper limit of satisfactory temperature has not been discovered, but it is above 575° F. and below 700° F.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A food press comprising:
 a cooking plate therein for placement on the top of a food product positioned on a heated griddle to press the food product against the griddle, said cooking plate having sufficient thermal mass that when said cooking plate is first heated on the griddle substantially to griddle temperature and thereafter placed on the food product it supplies sufficient heat to the food product to cook the upper portion of the food product;
 said food press having a skirt, said skirt having sides and top to surround the sides and top of said cooking plate, a handle on said press so that said press may be manually lifted on and off a griddle and manually lifted on and off a food product on the griddle, said cooking plate being movably mounted with respect to said skirt; and
 detent means interengaging said skirt and said cooking plate to selectively retain said cooking plate up within said skirt and to selectively permit said cooking plate to rest upon a griddle while said skirt rests upon the griddle around the periphery of said cooking plate.

2. The press of claim 1 wherein said bottom surface of said cooking plate has a mirror finish of about five microinches which is then anodized.

3. The press of claim 1 wherein said means interengaging said skirt and said cooking plate comprises at least one pin extending from said cooking plate and at least one slot in said skirt with said pin engaging in said slot.

4. The press of claim 3 wherein said slot has a detent notch therein for engagement by said pin when said cooking plate is adjacent the top of said skirt to selectively retain said cooking plate adjacent the top of said skirt.

5. A press for cooking a food product on a griddle, said press comprising:
 an aluminum cooking plate having a substantially flat substantially smooth lower cooking surface, said lower cooking surface being impregnated with a non-stick compound, the lower surface of said cooking plate being sufficiently large to reach the periphery of a cylindrical hamburger patty one half-inch thick weighing one-quarter pound, there being sufficient thermal mass in said cooking late to cook a one-quarter pound frozen hamburger patty in two minutes when the griddle temperature is 375 degrees F. and said cooking plate is initially heated to between 350 and 375 degrees F.;
 a skirt having a top positioned over said cooking plate and having sides and ends extending downwardly around the periphery of said cooking plate, said cooking plate being floatingly mounted with respect to said skirt so that said cooking plate can move in a position wherein its lower surface lies in the same plane with said sides and edges of said skirt to a position where said cooking plate is entirely within said skirt;

interengagement means between said skirt and said cooking plate, said interengagement means comprising first and second support pins extending from said cooking plate and first and second generally upright slots in said skirt, said pins being respectively engaged in said slot, detent notches in said slot, said detent notches being positioned to receive said support pins when said cooking plate is raised in said skirt towards the top of said skirt so as to selectively restrain downward motion of said cooking plate with respect to said skirt; and a handle secured to said press so that said press may be placed on the griddle to be heated by the griddle and can be placed upon a food product on the griddle, said cooking plate having sufficient thermal mass that when it is heated substantially to griddle temperature when the griddle is at food product cooking temperature, and is thereafter placed on a food product on the griddle, said cooking plate supplies sufficient heat to the food product to cook substantially the upper half of the food product.

6. The press of claim 5 wherein said cooking surface is anodized and said non-stick compound impregnated into said anodized surface is a heat treated shortening compound such as is produced by heating the shortening coated anodized surface to 575 degrees F. for 20 to 30 minutes.

7. A food press comprising:

a skirt, said skirt having sides, ends and top joined together to form a closed top and open bottom cup, said sides terminating substantially in a plane at their lower edge at the open bottom of said cup;

a cooking plate having a substantially flat bottom, said cooking plate being enclosed within and embraced by said skirt, said cooking plate being movable with respect to said skirt so that said cooking plate can move to a position wherein said flat bottom of said cooking plate lies substantially in said plane of said bottom edge of said skirt;

a handle connected to said food press to permit manual lifting of said food press;

interengagement means between said skirt and said cooking plate, said interengagement means selectively permitting said cooking plate to move from a position where it is recessed within said skirt to a position where its bottom surface lies substantially in said plane of said edges of said skirt and selectively permits retention of said cooking plate within said skirt away from said plane.

8. The food press of claim 7 wherein said interengagement means comprises at least one interengaging pin and slot with said slot having a detent notch therein for restraining said cooking plate in a retracted position with respect to said skirt.

9. The food press of claim 8 wherein there are at least two slots, each with a detent notch and there is one pin in each said slot.

10. The food press of claim 9 wherein said pins are mounted in said cooking plate and said slots are in said sides of said skirt.

11. The food press of claim 10 wherein said slots are in the configuration of an inverted "J".

* * * * *